Sept. 8, 1970 J. A. HOLLY 3,526,924
SEPARATOR SHEET FEEDER AND PATTY MOLDER
Original Filed Sept. 9, 1966 7 Sheets-Sheet 1

INVENTOR
JAMES A. HOLLY
BY
ATTORNEYS.

Sept. 8, 1970   J. A. HOLLY   3,526,924
SEPARATOR SHEET FEEDER AND PATTY MOLDER
Original Filed Sept. 9, 1966   7 Sheets-Sheet 6

United States Patent Office 3,526,924
Patented Sept. 8, 1970

3,526,924
SEPARATOR SHEET FEEDER AND PATTY MOLDER
James A. Holly, Olympia Fields, Ill., assignor to Hollymatic Corporation, a corporation of Delaware
Original application Sept. 9, 1966, Ser. No. 578,234, now Patent No. 3,417,425, dated Dec. 24, 1968. Divided and this application June 26, 1968, Ser. No. 740,117
Int. Cl. A22c 7/00
U.S. Cl. 17—32                                6 Claims

ABSTRACT OF THE DISCLOSURE

An apparatus for applying a sheet such as a separator sheet to a shaped article such as patties of moldable food material that are molded successively in a movable mold in which a carrier transfers a sheet from a stack of sheets into a frame in position to have the ejected article pick up its sheet when ejected from the mold and in which the carrier it itself moved by movement of the mold.

---

This application is a division of my copending application Ser. No. 578,234, filed Sept. 9, 1966, now Pat. No. 3,417,425, dated Dec. 24, 1968.

This invention relates to a molding apparatus for plastic material such as for molding patties out of ground meat, fish and other food products.

The apparatus of this invention provides for the molding of successive articles of the above type from moldable material such as the plastic food products rapidly and efficiently, and the apparatus itself is inexpensive, simple to operate, easy to clean and is of small size and occupies small space.

One of the features of this invention is to provide an improved molding apparatus with the above qualities.

Another feature of the invention is to provide an improved molding apparatus having a movable mold with a mold opening therein with means for moving the mold between a position where the mold opening communicates with an access passage from a hopper holding a supply of the material and a discharge position and back again and means operated simultaneously with the movement of the mold for operating feeder means in the hopper for moving material from the hopper into the mold opening.

Other features and advantages of the invention will be apparent from the following description of the invention taken in conjunction with one embodiment thereof as shown in the accompanying drawings. Of the drawings:

FIG. 4 is a fragmentary vertical sectional view through the bottom of the hopper and surrounding structure substantially along line 4—4 of FIG. 1.

Figure 2:
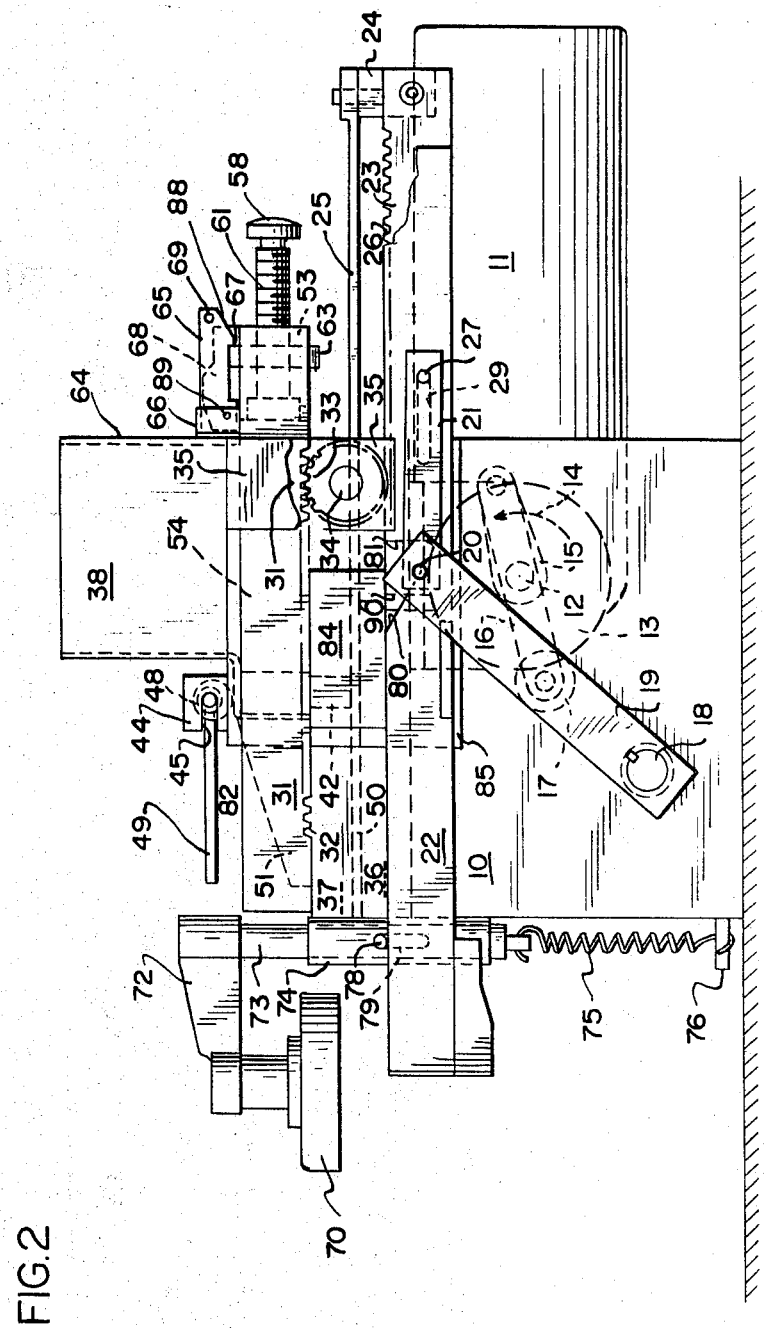
FIG. 2 is a side elevational view thereof taken from the front and partially broken away for clarity of illustration and showing the movable portions of the apparatus at one extreme end of their paths of movement.
Figure 3:
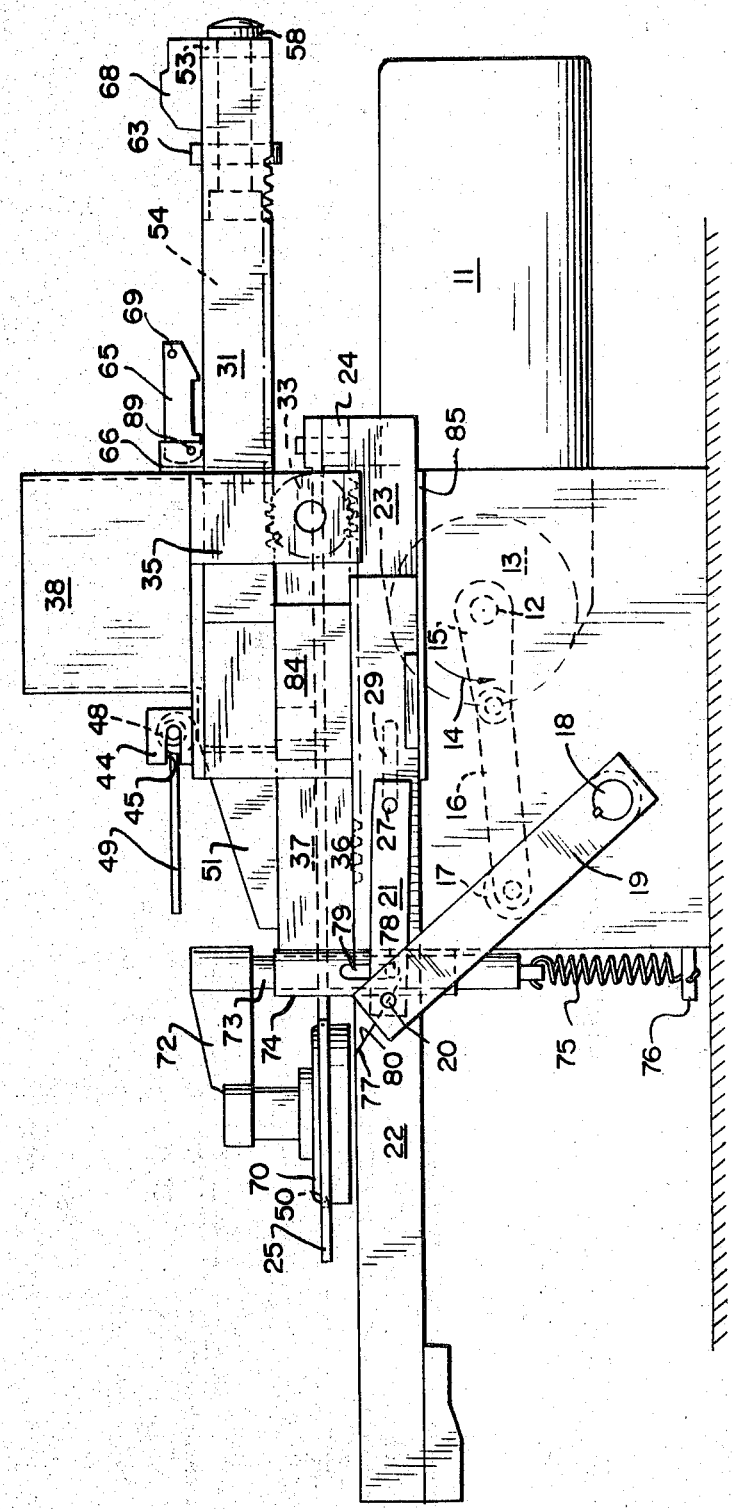
FIG. 3 is a view similar to FIG. 2 but showing the movable parts at the opposite extreme ends of their paths of movement.

The molding apparatus of this invention as shown in the drawings comprises a base housing 10 with a drive motor 11 extending to the right when the apparatus is viewed from the front or from the side shown in FIGS. 2 and 3 with this motor rotating the shaft 12 of a gear reducer 13. The shaft 12 is rotated in a counterclockwise direction when viewed from the front, as indicated by the arrow 14, and rotates a linkage 15 which drives a second linkage 16 which has one end attached to the outer end of the linkage 15 and the other end attached to a drive arm 17. Because of this construction the rotation of the gear reducer shaft 12 in a counterclockwise direction rotates the first linkage 15 and oscillates the drive arm 17 between the extreme positions shown in FIGS. 2 and 3. Because the bottom end of the drive arm 17 is attached to a transverse shaft 18 it also oscillates this shaft about its central axis.

Figure 10:
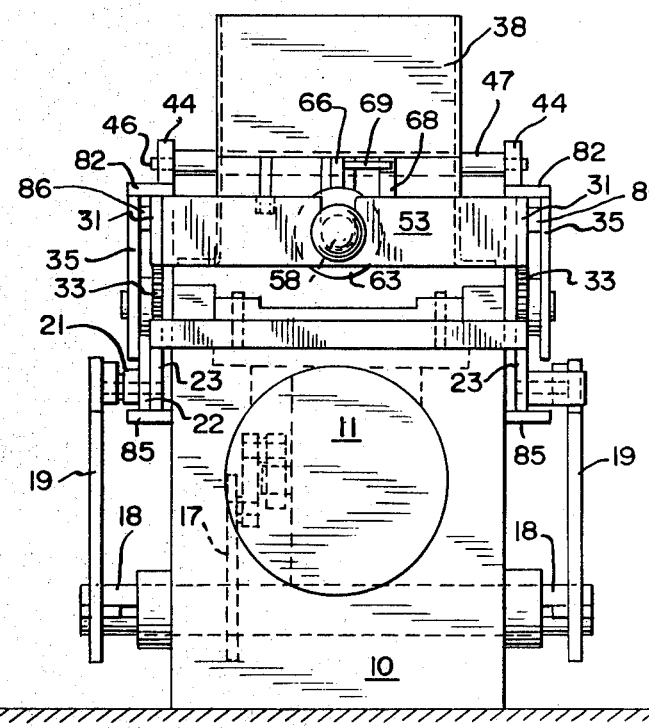
FIG. 10 is an end elevational view taken from the right-hand end of FIG. 2.
Figure 11:
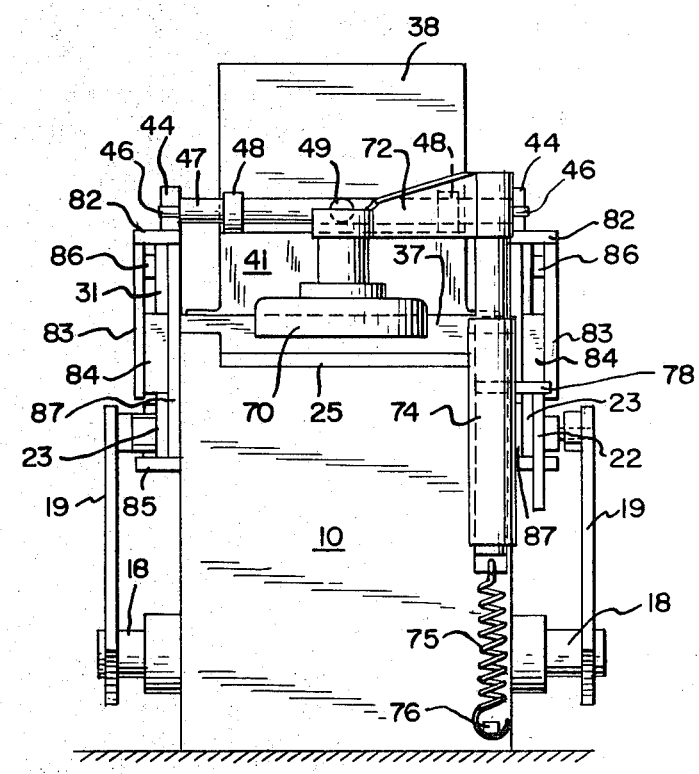
FIG. 11 is an end elevational view of the apparatus taken from the opposite end from that shown in FIG. 10.

As can be seen in FIG. 10 the ends of the shaft 18 extend outwardly at the front and back of the base housing 10.

Each end of the shaft 18 has attached thereto a similar lever 19 so that when the shaft 18 is oscillated in the manner described the lever 19 will be similarly oscillated about the central axis of the transverse shaft 18. The upper end of each lever 19 or the end opposite that attached to the drive shaft 18 is oscillatably connected by a hinge pin 20 to the forward end of a drive link 21 that extends generally horizontally. The rear end of this link 21 is similarly connected to a generally horizontal side cam plate 22 that is slidably mounted for horizontal reciprocation at the front of the apparatus.

Figure 1:
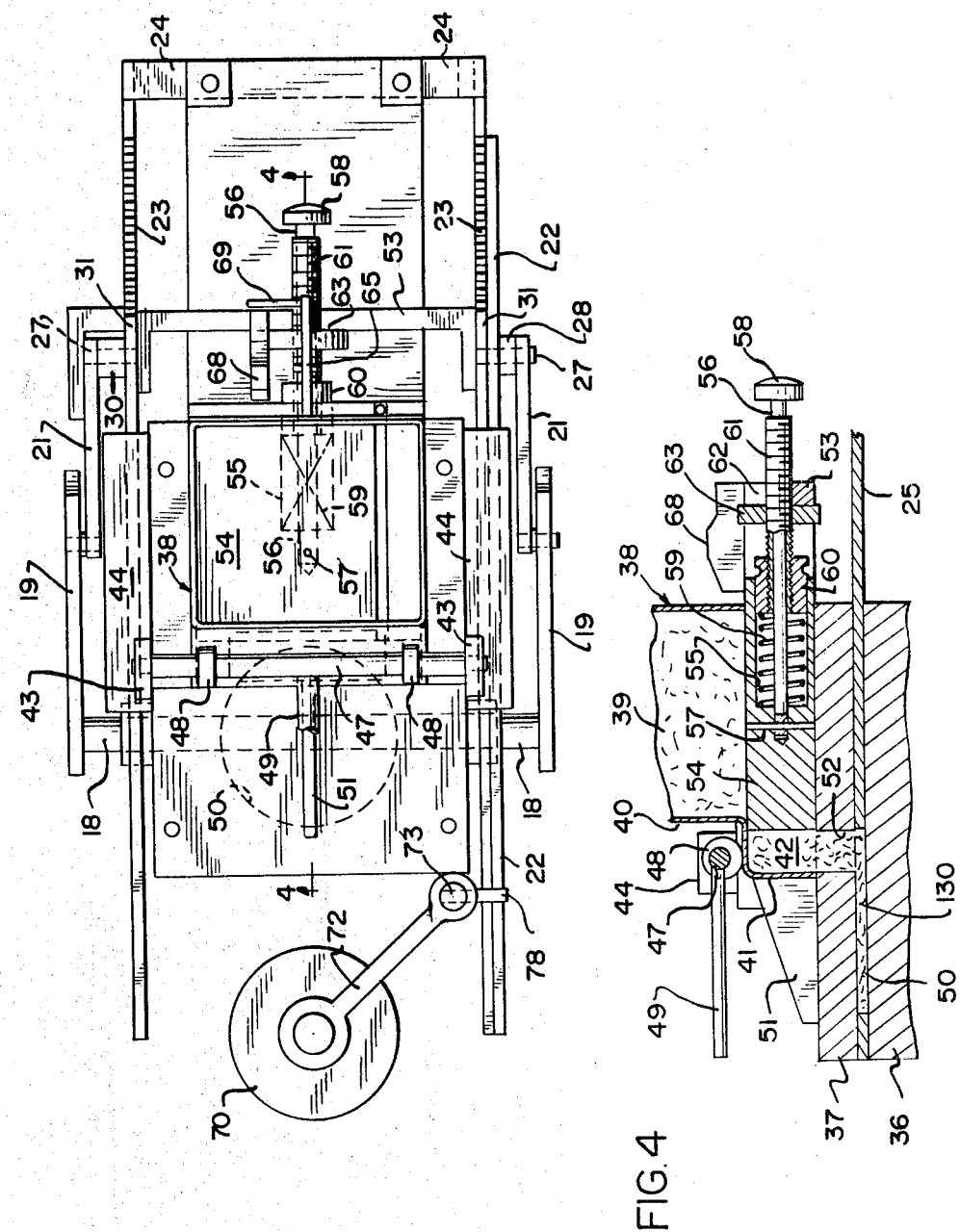
FIG. 1 is a plan view of one embodiment of the invention.

As can be seen from the drawings and particularly FIG. 1, there are provided two of the drive levers 19 and links 21 with one of each being at the front and the rear of the apparatus. However, there is only a single cam plate 22 which is at the front of the machine and the reason for this will be explained hereinafter.

Arranged in parallel relationship at the front and rear of the apparatus are a pair of first horizontal racks 23 that are attached by means of side brackets 24 at the rear of the racks 23 and at the rear of the apparatus to the rear end of a horizontal reciprocable mold plate 25. The side brackets 24 attach the rear ends of the pair of first racks 23 and the mold plate 25 with all being substantially parallel and horizontal. As can be seen from the drawings, the teeth 26 of the first racks 23 are exposed upwardly.

A driving connection between the side links 21 and the first racks 23 and through the brackets 24 to the mold plate 25 is provided by a horizontal pin 27 at the front and rear of the apparatus. The front pin 27 extends rearwardly from the front drive link 21 through a spacer 28, through the cam plate 22 and into the front first rack 23. This end of the pin 27 engages a horizontally elongated slot 29 in the front first rack 23, as shown in FIGS. 2 and 3, in order to provide a lost motion connection to this first rack 23 and thus the mold plate 25. The purpose of this lost motion will be described hereinafter.

The opposite pin 27 on the rear of the apparatus also has its outer end engaging the rear drive link 21 and extends from there through a spacer 30 and into the rear first rack 23 where it engages a slot therein exactly the same as the slot 29 in the forward first rack 23.

Positioned above each first rack 23 is a second rack 31 with a pair of racks 31 each being arranged parallel to a corresponding first rack 23. The teeth 32 of the second racks 31 face and are parallel to the teeth 26 of the first racks 23. Located between and in engagement with each corresponding pair of first and second racks 23 and 31 is a gear wheel 33 each mounted on an axle 34 for rotation thereof with each axle held in a side vertical bracket 35.

The mold plate 25 which is connected to the first rack 23 by side rear brackets 24 is horizontally slidable between a bottom plate 36 and a top plate 37, as shown most clearly in FIG. 4.

Releasably mounted on the top of the top plate 37 is a hopper 38 for holding a supply 39 of the material to be molded such as the ground beef for making hamburger patties. The hopper 38 has a forward side 40 that is provided with a forward step portion 41 to provide a front cavity 42 extending thereacross. This step portion 41 has a flat upper surface, as shown in FIG. 4, which is utilized in releasably clamping the hopper 38 to the frame of the apparatus. In the specific embodiment illustrated, this is accomplished by providing side upwardly extending arms 43 on opposite sides of the machine with each arm having an upper end 44 extending above the top of the step portion 41 and provided with a forwardly opening horizontal slot 45. Releasably held in each slot 45 is a reduced end 46 of a horizontal rod 47 that carries intermediate the arm 43 a pair of cams 48 that are generally circular but arranged eccentrically to the axis of the rod 47 as shown in FIG. 4. The rod 47 is also provided with at about its midpoint with a forwardly extending handle 49 for rotating the rod 47 about its axis and thus the cams 48. With this arrangement the hopper 38 is locked in position by the cams 48 when the parts are in the position shown in the drawings.

To release the hopper 38 as well as the plates 36 and 37, the mold plate 25 and the mechanism to be described hereinafter that is associated with the hopper 38, it is merely necessary to turn the handle 49 in a clockwise direction from the position shown in FIGS. 2, 3 and 4 which will relieve the pressure of the cams 48 on the top of the step portion 41 of the hopper. The rod 47 and associated structure can then be moved by merely pulling forwardly to disengage the rod ends 46 from the horizontal slots 45.

In order to assist in holding the top plate 37 in close sealing relationship with the upper surface of the reciprocable mold plate 25, particularly while pressure is being applied to the moldable material that is forced into the mold opening 50 in the mold plate 25, there is provided a holddown foot 51 extending forwardly from the step portion 41 and bearing against the top surface of the plate 37 as shown most clearly in FIG. 4.

The second racks 31 which because of the positioning of the circular gear 33 are driven in an opposite direction from the first racks 23 are used to operate the feed mechanism which forces the material 39 from the hopper 38 into the mold opening 50 by way of the front cavity 42 and feed slot 52. As can be seen in FIG. 4, this feed slot 52 extends downwardly from the front cavity 42 and communicates with the rear of the mold opening 50 during filling thereof when the mold plate 25 is in its rearmost position as shown in FIGS. 1, 2 and 4.

The pair of second racks 31 are arranged on opposite sides of the apparatus, as shown in FIG. 1, and the rear ends are connected by means of a cross bar 53. This cross bar is located at all times to the rear of the hopper 38 and is spaced therefrom. In front of the cross bar 53 there is positioned a feed ram 54 that is reciprocable from substantially entirely outside the hopper, as shown in FIG. 3, to within the hopper, as shown in FIGS. 1 and 4, in forcing material 39 from the bottom of the hopper into the mold opening 50 by way of the cavity 42 and feed slot 52. As can be seen particularly from FIG. 4, ram 54 is reciprocable in sliding contact with the top surface of the top plate 37.

In the rear of the ram 54 there is provided a generally cylindrical cavity 55 symmetrically arranged with respect to the sides of the ram as shown in FIG. 1. Located axially within this cavity 55 and extending forwardly thereof into the ram 54 and rearwardly thereof beyond the cross bar 53 is a pin 56. The forward end of this pin extends beyond the cavity 55 and is attached to the ram 54 by means of a vertical tie 57. The rear end of the pin 56 is provided with an enlarged button 58 spaced rearwardly of the cross bar 53.

Located within the cavity 55 and around the corresponding portion of pin 56 is a helical spring 59. The forward end of this spring bears against the forward or bottom end of the cavity 55 while the rear end of the spring bears against a generally cylindrical nut 60 which is slidable within the cylindrical cavity 55 in the same manner as a piston is slidable in a cylinder. In order to provide adjustment the nut 60 is threaded to a tube 61 through which the pin 56 extends with the front end of this threaded tube 61 being positioned within the nut 60 and the rear end normally being positioned in front of the button 58 that is on the rear end of the pin 56. The cross bar 53 is cut away in a U-shaped cut 62 at the top thereof and opening upwardly to provide space for the threaded tube 61.

Also threaded to the tube 61 so as to be adjustable thereon is a drive collar 63. This collar is located between the rear of the nut 60 and the front of the cross bar 53 as shown, for example, in FIGS. 1 and 4.

The rear side 64 of the hopper 38 is provided with a latch 65 that extends generally horizontally and with its front end hingedly attached to a mounting bracket 66 on the rear side 64 and its rear end at the bottom provided with a hook 67. This hook 67 is adapted to engage the top of the drive collar 63 and is shown most clearly in FIG. 2.

The spacing of the rear button 58 on the pin 56 and the forwardly located collar 63 provides spaced rear and forward stops respectively for the cross bar 53 and in effect provides a lost motion arrangement.

In order to provide means for disengaging the latch 65 from the collar 63 the cross bar 53 carries a cam 68 located at one side of the catch 65. In order to provide engagement with the cam 68 the rear end of the catch 65 rearwardly of the collar 63 carries a cross pin 69 (FIG. 1). The upper surface of the cam 68 is adapted to engage this cross pin 69 when the cross bar 53 which carries the cam 68 moves rearwardly away from the collar 63. This engagement lifts the latch 65 away from the collar 63 thereby releasing it.

In order to remove a molded patty from the mold opening 50 when the mold plate 25 is in fully extended position as shown in FIG. 3 there is provided a knockout mechanism comprising a knockout ring 70 adapted to enter the mold opening 50 in the manner illustrated in FIG. 3. This knockout ring is mounted on an arm 72 overhanging the path of movement of the mold plate with the ring being mounted on one end of the arm and the other end mounted on a vertical rod 73 located at one side of the apparatus as shown in FIG. 1 and arranged for vertical reciprocation in a cylindrical sleeve 74. The lower end of this rod 73 extends beyond the bottom of the sleeve 74 and has attached thereto a helical spring 75 whose other end is attached to a bracket 76 with the result that the rod 73 and thus the ring 70 is urged constantly in a downward direction.

In order to operate the knockout ring the cam plate 22 which is at the front of the machine is provided with a notch 77. This notch is adapted to be engaged by a pin 78 that extends laterally from the rod 73 and that is movable vertically in a vertical slot 79 in the sleeve 74. The notch 77 is shown most clearly in FIG. 3 and has an upwardly and forwardly sloped front surface 80 and a vertical rear surface 81.

The two racks 23 and 31 on each side of the machine are arranged in a vertical plane with the gear 33 therebetween and mounted on the vertical bracket 35. The top of the bracket 35 on each side of the machine is turned inwardly as indicated at 82 and each carries an upper bracket end 44. Located forwardly of the side brackets 35 are side enclosing plates 83 that carry on their inner surfaces side guide blocks 84. These guide blocks 84 are slidably engaged on their bottoms and tops by the first rack 23 and second rack 31. Thus these guide blocks 84 in combination with the side plates 83 and brackets 35 guide the two sets of racks in their linear movement. The bottom of the lower rack 23 slides against a bottom bracket 85 while the top of the upper racks 31 slide against the bottoms of the horizontal bracket ends 82. Because the blocks 84 are relatively thick, spacers 86 are provided on either side between the plates 83 and the top or second rack 31. A similar guide spacer 87 is provided for each of the bottom or first racks 23.

Figure 12:
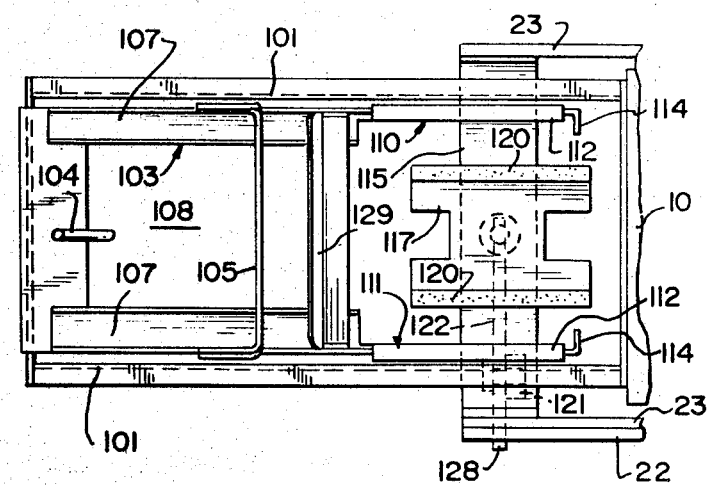
FIG. 12 is a plan view of the flexible separator sheet applying end of the apparatus.

The operation of the molding portion of the apparatus is as follows:

With the parts in their positions as shown in FIG. 3 the mold plate 25 is fully extended to the left or front, the rack 23 is in its forwardmost position, the knockout ring 70 is still within the mold opening 50 which it entered to remove therefrom the preceding molded patty (see FIG. 12), the upper or second racks 31 together with the feeding ram 54 are in their retracted positions, or to their extreme positions to the rear of the apparatus, and the driving mechanism including the linkages 15 and 16, drive arm 17 and levers 19 are just ready to begin their rearward movement. Because the knockout ring 70 is in its knockout position, the cam follower pin 78 is at the bottom of the cam notch 77 in the cam plate 22. Furthermore, the pin 27 that extends on opposite sides of the cam plate 22 is at the forward end of its lost motion slot 29 in the bottom rack 23. As stated, there is such a pin and slot arrangement in each of the side bottom racks 23.

On further rotation of the gear reducer 13 in a counterclockwise direction, as viewed in FIG. 3 and as indicated by the arrow 14, the linkages 15 and 16 move the levers 19 clockwise as viewed in FIG. 3. Because of the lost motion connection provided by the pin 27 and slot 29 in the pair of first or lower racks 23, the cam plate 22 begins immediately to move rearwardly but the lower racks 23 and thus the mold plate 25 remain stationary. This rearward movement of the cam plate 22 causes the knockout ring pin 78 to be forced upwardly by engagement thereof with the upwardly inclined front surface 80 of the cam notch 77 with the result that the knockout rod 73, supporting arm 72 and ring 70 are lifted upwardly to lift the ring from within the mold opening 50 from the position shown in FIG. 3 to the raised position shown in FIG. 2.

Further movement of the lever system including the drive levers 19 toward the rear or in a clockwise direction as viewed from FIG. 3 causes the pin 27 on the drive link 21 to be moved toward the rear of its lost motion slot 29. By this time the knockout ring 70 has been raised clear of the mold opening 50 in the mold plate 25. When the pins 27 have thusly moved to the rear ends of their slots 29 further movement thereupon causes the first racks 23 and the attached mold plate 25 to be moved to the rear of the apparatus or to the right as viewed in FIG. 3. This movement continues until the mold plate opening 50 is again in communication with the front cavity 42 in the hopper 38 and the feed slot 52 immediately therebeneath or to the position shown in FIG. 4.

While the lower first racks 23 are thus being moved rearwardly, they cause rotation of the side gears 33 which move the upper or second racks 31 in the opposite direction from the first racks 23 or toward the front of the apparatus.

When this occurs, the cross bar 53 which at the beginning of the cycle was against the rear button 58, as shown in FIG. 3, is moved forwardly to engage the rear surface of the drive collar 63 which is adjustably threadedly held on the threaded tube 61 as explained earlier and as shown most clearly in FIGS. 1 and 4. The feed ram does not begin to move forwardly until the cross bar has contacted the collar 63.

When this occurs the continued forward motion of the pair of upper or second racks 31 between which the cross bar 53 extends at the rear thereof causes the cross bar 53 to force the collar 63, the engaged threaded tube 61 and the slidable nut 60 forwardly. This forces the ram 54 toward the cavity 42 to force the material 39 into the mold cavity 50 by way of the fill slot 52 and on continuing movement of the cross bar 53 and collar 63 the spring 59 is compressed as the ram is now stopped.

As can be seen the final forward pressure on the feed ram 54 at the end of the feed stroke is controlled by the compressive force of the spring 59. Because the nut 60 is threaded to the tube 61 this force can be regulated so as to regulate the force applied to the moldable material 39. Furthermore, a desired spring 59 can be chosen so as to provide the desired molding force on the material 39.

The extent of forward movement of the feed ram 54 (to the left as viewed in FIG. 4) is controlled by the size of patty desired which of course regulates the size of the mold opening 50 in the replaceable mold plate 25. On large patties, such as those of 6 ounces, the forward end of the ram 54 goes almost the entire distance to the wall of the step portion 41 which forms the forward extremity of the front cavity 42. To produce a small patty however, such as one containing 2 ounces of moldable material, the forward end of the ram 54 goes only a small distance into the front cavity 42. The location of the forward end of the ram 54 in FIG. 4 is an illustration of the extent of movement in producing a small patty.

In order to provide this adjustment of extent of movement of the ram 54 which depends upon the size of the patty to be produced, the drive collar 63 is threadably adjustable on the tube 61. Because the position of the collar 63 at the end of the forward movement of the ram 54 is always the same position, the adjusting of the threaded collar 63 on the tube 61 therefore determines the forwardmost position of the ram 54.

Because the collar 63 is always in the same position at the completion of the feeding stroke which is provided by the cross bar 53 engaging the rear of the collar 63 and moving the ram 54 forwardly, the final spring pressure of the spring 59 is used only for maintaining the plastic material 130 in the mold opening until the mold opening has been moved forwardly out of communication with the feed slot 52. As previously described the extent of compression of the spring at the completion of the forward stroke may be very small, such as about 5/16 inch. This reduces considerably the power required to operate the apparatus regardless of the size of the patties produced which in one embodiment of the invention ranged from two to six ounces.

At the completion of the forward stroke of the upper or second racks 31 and the cross bar 53 the feed ram 54 is in substantially the position shown in FIGS. 1, 2 and 4 for a small patty as this is the forwardmost position of the second racks and cross bar. In this position the latch 65 which has been displaced upwardly by contact of the top of the collar 63 with the forward cam surface 88 on the latch permits the latch to drop down so that the hook 67 on its bottom surface engages the rear of the collar 63. This serves to retain the collar 63 in its forward position so that pressure of the spring 59 is maintained through the ram 54 on the material in the cavity 42, feed slot 52 and material within the mold opening 50. This pressure is thus maintained on the material in the mold opening 50 until the reverse motion of the mold plate 25 or its movement toward the front of the apparatus moves the rear of the mold opening 50 out of communication with the feed slot 52 and prevents the compressed moldable material springing back into the slot 52 and cavity 42.

Because the forward motion of the mold plate 25 caused by the forward motion of the lower or first racks 23 is in a direction opposite to that of the upper or second racks 31 because of the intermediate gear wheels 33, the second racks 31 and their cross bar 53 are simultaneously moved rearwardly. As the latch 65 is still in engagement with the collar 63 there is no corresponding immediate rearward movement at this initial time of the tube 61, pin 56 and feed ram 54 because the distance between the button 58 and the collar 63 provides a lost motion connection. This maintains pressure on the material in the mold opening 50 until the opening has been moved out of communication with feed slot 52.

The fearward movement of the upper racks 31 and the cross bar 53 causes corresponding movement of the release cam 68 carried by the cross bar 53. The upper cam surface of this cam 68 engages the cross pin 69 on the rear end of the catch 65 and raises the catch about its mounting hinge 89. This releases the hook 67 of the catch from the top of the collar 63 and further rearward movement of the upper racks 31 and their cross bar 53 causes the bar 53 to engage the front of the button 58 on the rear end of the pin 56 to withdraw the feeding ram 54 from the position shown in FIGS. 1 and 4 to the rearmost position shown in FIG. 5.

The continuing forward movement of the lower or first racks 23 and the attached mold plate 25 brings the knockout pin 78 into alignment with the top of the knockout slot 90 in the front first rack 23. As soon as this alignment is achieved, the downward pull of the spring 75 causes the rod 73, arm 72 and knockout ring 70 to be lowered abruptly so that the ring enters the mold opening 50, as shown in FIG. 3, and dislodges the patty that was therein. At this time, the parts of the apparatus are in their initial position as shown in FIG. 3.

The sequence of positions of the parts of the apparatus are further shown in FIGS. 5–9 inclusive. Thus, in FIG. 5 the parts have advanced from their positions shown in FIG. 2 at the start of the portion of the cycle during which the mold plate 25 is moved forwardly by the levers 19 and 21 and the feed ram 52 is retracted rearwardly. In FIG. 2, as mentioned previously, the drive pin 27 is at the rear end of its lost motion slot 29 so that forward motion of the lever 19 causes forward motion of the cam plate 22 while the lower racks 23 and mold plate 25 remains stationary because of this lost motion. At this stage the mold opening 50 is still in communication with the material in the passages 42 and 52 which is still under pressure of the spring 59 with the pressure being maintained due to the latch 65 engaging the collar 63, all as shown in FIGS. 2–5.

Figure 6:
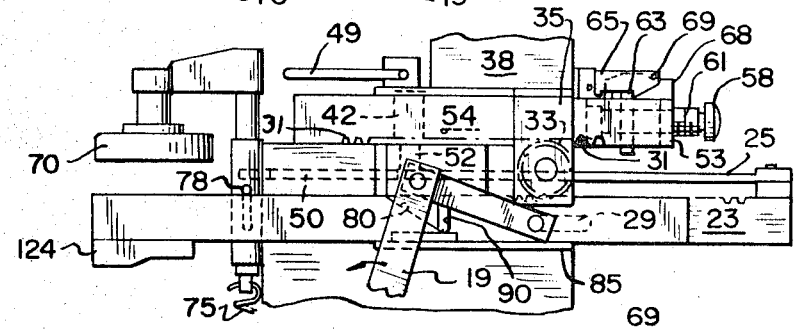
FIG. 6 is a view similar to FIG. 5 but showing the movable parts at a further position in their movements.

Further forward movement of the lever 19 to the position shown in FIG. 6 causes further forward movement of the lower racks 23 and mold plate 25 to where the mold opening 50 is now out of communication with the feed slot 52. Tihs forward movement causes corresponding rearward movement of the upper or second racks 31 with corresponding rearward movement of the cross bar 53 to a position between collar 63 and button 58. At this point the latch 65 is still in engagement with the collar 63 but the latch cross pin 69 is about to be engaged by the cam 68 carried by the cross bar 53.

Figure 7:
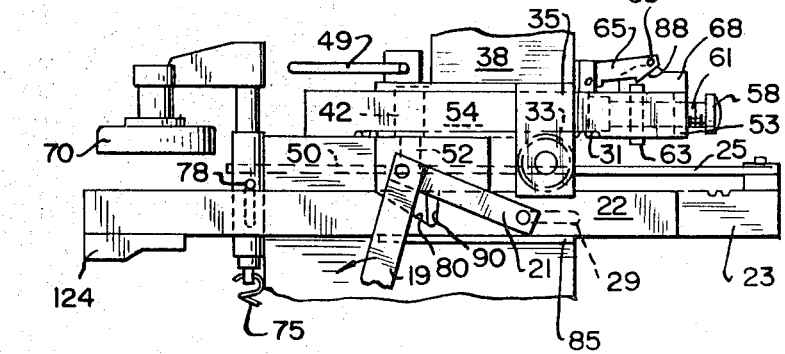
FIG. 7 is a view similar to FIGS. 5 and 6 but showing the movable parts at an intermediate position between their position of FIG. 6 and their extreme position of FIG. 4.

Further forward movement of the drive mechanism as illustarted by the lever 19 and link 21 to the position shown in FIG. 7 advances the mold plate 25 still further and moves the cross bar 53 nearer the button 58. The cam 68 now raises the catch 65 from engagement with the collar 63 so that the collar is free to be forced rearwardly against the cross bar 53 by the action of the compressed spring 59 (FIGS. 1 and 7).

Figure 8:
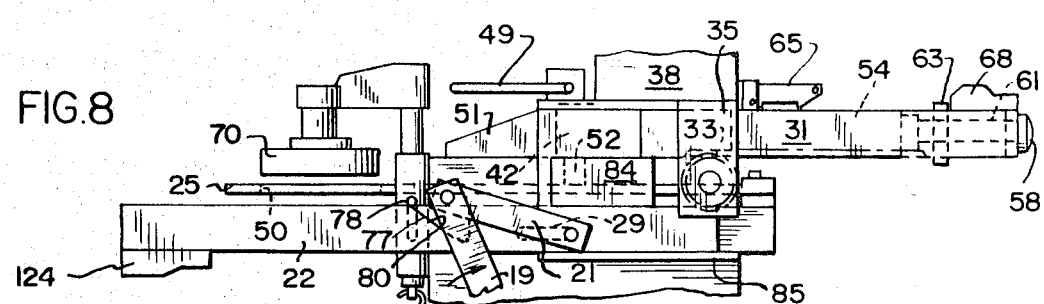
FIG. 8 is a view similar to FIGS. 5–7 but showing the parts after return movement has commenced from the position in FIG. 3.
Figure 9:
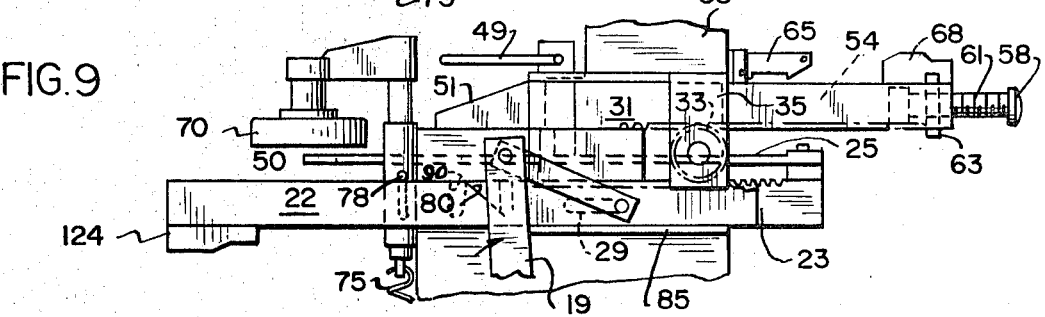
FIG. 9 is a view similar to FIGS. 5–8 but showing the parts further retracted toward the starting position of FIG. 2.

FIGS. 8 and 9 taken in conjunction with FIG. 3 illustrate the movement of the parts toward their retracted position. Thus, as stated earlier, FIG. 3 shows the position of the parts when the mold plate 25 is fully extended and the knockout ring 70 has just been projected into the mold openign 50 to remove the preceding patty. At this time the lever 19 and linkage system 15–16 are at their forwardmost positions. The lifting pin 78 for the knockout ring 70 is at the bottom of the inclined surface 80 of the cam notch 77 and at the bottom of its vertical guide slot 79.

Movement of the parts from the position shown in FIG. 3 to the positions shown in FIG. 8 causes rearward movement of the cam plate 22 with the result that the pin 78 rides up the sloped front surface 80 to withdraw the knockout ring 70 from the mold opening 50.

Further movement of the parts from the positions shown in FIG. 8 to the positions shown in FIG. 9 causes further rearward movement of the mold plate 25 and forward movement of the upper or second racks 31 with corresponding forward movement of the feed ram 54.

Figure 5:
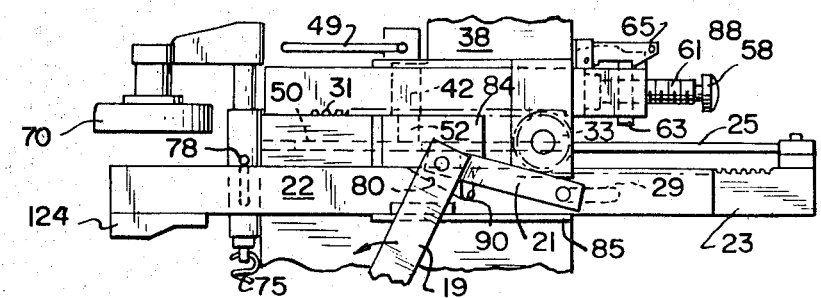
FIG. 5 is a fragmentary side elevational view similar to the central portion of FIG. 2 and illustrating certain parts after movement of these parts has begun from their position in FIG. 2.

Then, as previously described, at the extreme rearward movement of FIG. 2 of the mold plate 25 the mold opening 50 is again in communication with the feed slot 52 and the ram 54 is held in its forwardmost position and momentarily locked in this position by engagement of the latch 65 of the collar 63 to apply continuing spring pressure to the material within the mold opening 50 until the opening has been moved out of communication with the feed slot 42 or from the position shown in FIG. 5 to the position shown in FIG. 6.

Figure 13:
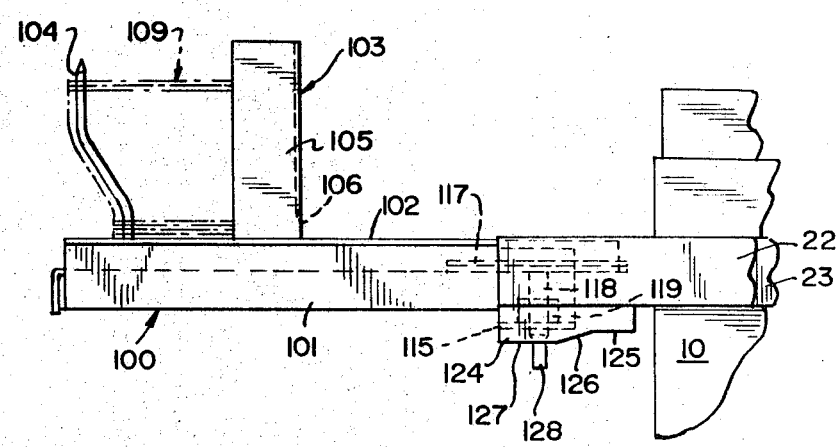
FIG. 13 is a fragmentary side elevational view of the portion of the apparatus shown in FIG. 12 with the mechanism at one end of its path of movement.
Figure 14:
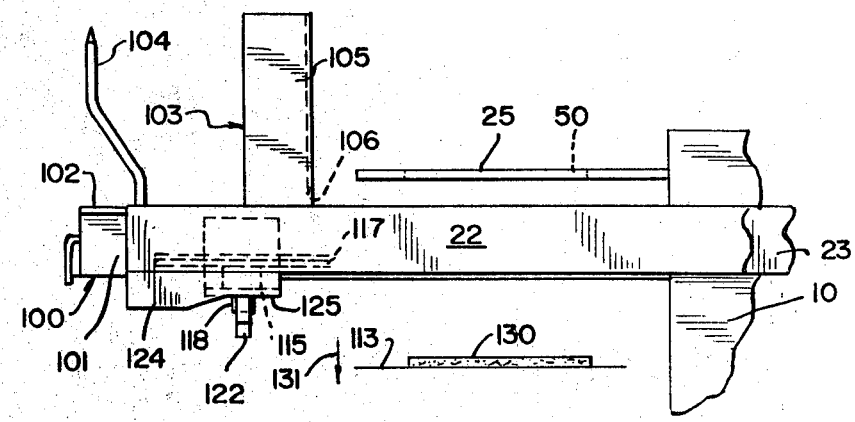
FIG. 14 is a view similar to FIG. 13 but with the mechanism at the other end of its path of movement.

The separator sheet applying portion of the apparatus is shown in FIGS. 12–17 inclusive. As is shown here, there is provided a support structure 100 extending forwardly from the base 10 to an area considerably beyond the extended position of the mold plate 25 as shown in FIG. 14. This support structure comprises a pair of spaced parallel metal support strips 101 having outwardly projecting coplanar flanges 102 at their upper edges.

At the extreme forward end of the support structure there is mounted stack retaining means 103 for retaining a stack of separator sheets comprising an upwardly extending spindle 104, a forward sheet retaining plate 105 open at the bottom, as indicated at 106, and side sheet supports 107 spaced from each other to provide an open stack access bottom 108.

Figure 16:
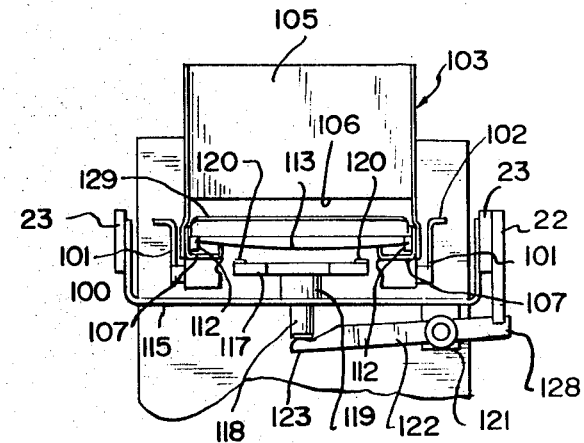
FIG. 16 is a view similar to FIG. 15 but with the sheet carrying platform in lowered position.

Positioned rearwardly of the stack retaining means 103 which is adapted to retain a stack of sheets, as indicated at 109 in FIG. 13, there is also positioned on the support structure 100 a sheet retaining means 110 in the form of a frame 111 having side supports 112 on which a separator sheet 113 is adapted to be supported spanning the space between the sides 112 as shown in FIG. 16. The frame 111 is also provided with rearwardly located flange strips 114 for limiting the extent of forward carrying of the sheet.

Figure 15:
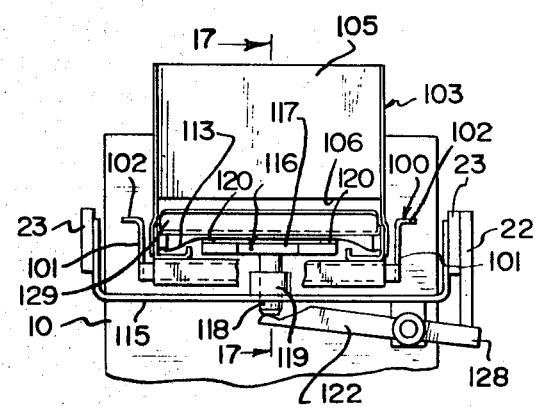
FIG. 15 is an end elevation taken from the left-hand end of FIG. 14 but with the sheet carrying platform in elevated position.

As is shown most clearly in FIGS. 15 and 16 the forward ends of the two side parallel first racks 23 which are a part of the moving means for moving the mold plate 25 has extending therebetween a horizontal metal strap 115 constituting a mounting means for a vertically reciprocable carrier 116 for carrying the individual separator sheets 113 between the stack retaining means 103 and the forward sheet retaining means 110. This carrier 116 comprises a vertically reciprocable platform 117 mounted for movement on a vertical post 118 held in a bushing 119 on top of the metal cross strap 115. The top of this carrier platform 117 is provided with parallel friction strips 120 for aiding in retaining the separator sheet thereon.

In order to raise and lower the carrier platform 117 there is provided on the bottom of the cross strap 115 adjacent the end thereof that is next to the cam plate 22 a bracket 121 on which is fulcrumed a lever 122. This lever has its inner end 123 engaging the bottom of the post 118 on which the platform 117 is mounted and its other end located beneath the cam plate 22 which forms a part of the means for removing the molded article (here the flat patty) from the mold 25. As explained earlier, this cam plate 22 is provided intermediate its ends with the cam notch 77 which operates the knockout ring 70 and removes it from the mold opening 50. In order to operate the lever 22 and thus raise and lower the platform 117 the mold cam plate 22 is provided on its forward end with a cam 124. This cam is in the form of a downwardly extending plate and has a flat surface 125 at its rear end, a downwardly and forwardly sloped cam surface 126 forwardly thereof and a second and lower flat surface 127 forwardly of the cam surface 126. With this arrangement when the outer end 128 of the lever is engaged by the forward or second flat surface 127 the platform 117 is in elevated position as shown in FIGS. 12, 13, 15 and 17. Then, when the lever end is in engagement with the shallower or first flat surface 125 the platform 117 is in lowered position as shown in FIGS. 14 and 16.

As stated earlier, the racks 23 which function as mold moving means plates and the article removing means cam plate 22 are moved generally simultaneously but have lost motion connections so that at each end of their paths of reciprocation the mold moving means plates or first racks 23 are maintained stationary while the cam plate 22 continues to move. This lost motion connection which includes the cross pin 27 and slot 29 in the first rack 23 not only provides time for the knockout ring 70 to enter and leave the mold opening 50, as previously described, and for filling the mold opening through the front cavity 42 from the hopper 38, but also provides relative movement between the plates 22 and plate 23 so that the cam 124 may be operated to raise and lower the sheet supporting platform 117.

Figure 17:
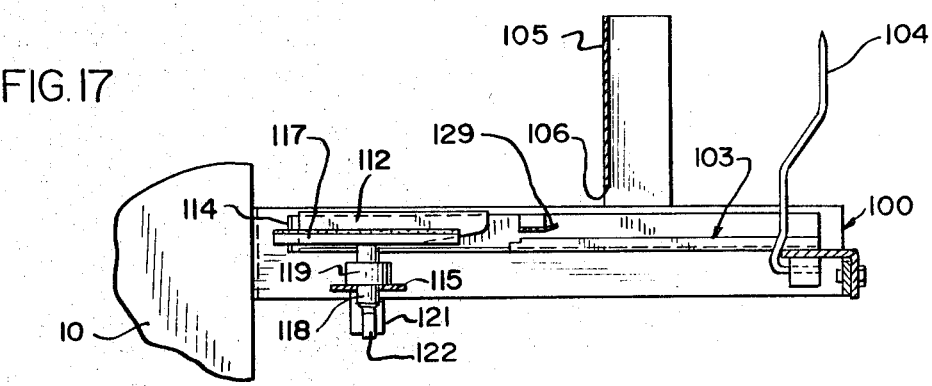
FIG. 17 is a sectional view taken substantially along line 17—17 of FIG. 15.

When the platform is being moved from the position shown in FIG. 17, where it is beneath the stack retaining means 103, to the position shown in FIG. 13 for depositing a sheet 113 in the supporting frame 111 the sheet being transported is pressed securely against the top of the platform by an inclined plate 129 that is positioned between the sheet retaining plate 105 and the forwardmost position of the platform 117 as shown, for example, in FIG. 17.

The operation of the sheet feeding portion of the apparatus is as follows. As has already been described the mold plate 25 is reciprocated between the position shown in FIGS. 1, 2 and 7 for receiving plastic material 39 from the hopper 38 by way of the feed slot 52 to a forward position shown in FIGS. 3 and 14 where the knockout ring 70 is snapped downwardly into the mold opening 50 to remove a patty 130 therefrom. When the mold plate 25 is in this extended position the cam plate 22 and pair of first racks 23 are also extended forwardly as shown in FIG. 14. At this time the cross pins 27 are in the forward ends of the lost motion slots 29 as shown in FIG. 3.

Then, when the drive mechanism starts its return movement the cam plate 22 starts its rearward movement and the knockout ring 70 is lifted from the mold opening, where it is shown in FIG 3, by the engagement of the lifting pin 78 with the front surface 80 of the cam notch 77. Because of the lost motion connection provided by the cross pins 27 and the elongated slots 29 the mold plate 25 remains stationary while each pin 27 moves from the forward end of the slot 29 (the left end as shown in FIG. 3) to the rear end thereof. During this delayed interval the knockout ring 70 is lifted from the mold opening 50 by the engagement of the pin 78 with the upwardly inclined edge 80 of the lifting cam 77 in the plate 44. During this rearward movement of the cam plate 22 the lever 122 is rotated clockwise from the position shown in FIG. 16 to the position shown in FIG. 15. This causes the platform 117 to lift and engage the bottom sheet on the stack of separator sheets 109.

Then, continued forward movement of the cam plate 22 and first racks 23 by the drive mechanism acting through the cross pins 27 engaging the rear ends of the lost motion slots 29 causes the platform 117 to carry the separator sheet 113 thereon to a forward position where the sheet is above the side supports 112 as shown in FIG. 15. Then, on the return trip of the first racks 23 and the side cam plate 22 the lost motion connection again causes the cam plate 22 to move forwardly with respect to the first racks 23 so that the end 128 of the lever 122 which had been engaged by the lowermost flat surface 127 is now engaged by the higher flat surface 125 as shown in FIGS. 14 and 16. As the platform is still within the side supports 112 for the separator sheet 113 this lowers the platform 117 with the sheet 113 leaving it extending across the side supports 112 as shown in FIG. 16. Further forward movement then returns the cam plate 22 and first racks 23 to their forwardmost position of FIG. 14 and throughout this movement the separator sheet carrying platform 117 is in lowered position as shown in FIG. 16. During this forward movement the mold plate 25 is again extended out of the apparatus so that the knockout ring can remove the molded patty from the mold opening 50 with the result that it falls through the frame 111, as illustrated by the arrow 131 of FIG. 14, carrying with it the separator sheet 113 that was supported across the frame.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. In an article shaping device in which an article is shaped and ejected from said device in a path, apparatus for applying a flexible sheet to the shaped article, comprising: a sheet retaining means including a frame defining an opening in said path through which said article passes, said frame having retaining means for retaining said sheet across said opening; stack means for releasably holding a stack of said sheets spaced from said frame and having a stack access bottom; molding means including a mold having a mold opening therein, moving means for moving said mold between a retracted position within said device and an extended position with said mold opening over said frame and back again, and article removing means for ejecting said article from said mold opening in said path at said extended position; a carrier having sheet engaging means thereon; mounting means for said carrier on said mold moving means on which said carrier is vertically movable, said carrier being located beneath said stack of sheets when said mold is in said extended position and at said frame when said mold is in said retracted position; and means on said article removing means for raising said carrier beneath said stack to engage a lowermost sheet thereon when said mold is in said extended position, and lower said carrier to deposit a sheet thereon in said frame when said mold is in said retracted position.

2. The apparatus of claim 1 wherein there is provided a support structure extending from said device forwardly beyond said extended position of said mold, with said support structure having mounted thereon said sheet retaining means and said stack means.

3. The apparatus of claim 1 wherein a pivoted lever is also mounted on said mounting means for said raising of said carrier.

4. The apparatus of claim 1 wherein lost motion connection means is provided between said mold moving means and said article removing means to provide a time interval during which said carrier is thusly raised beneath said stack when said mold is in said extended position and thusly lowered to deposit said sheet in said frame when said mold is in said retracted position.

5. The apparatus of claim 1 wherein said article removing means comprises a reciprocable member reciprocable by said moving means and having force applying means thereon for said raising and lowering of said carrier.

6. The apparatus of claim 5 wherein said reciprocable member has force applying means thereon for operating said article removing means.

References Cited

UNITED STATES PATENTS

| | | | |
|---|---|---|---|
| 2,981,973 | 5/1961 | Elmore | 17—32 XR |
| 3,347,176 | 10/1967 | Hall | 107—4.5 |

WALTER A. SCHEEL, Primary Examiner

R. T. SMITH, Assistant Examiner

U.S. Cl. X.R.

107—4; 271—9